March 27, 1928.
A. F. HOTTINGER
1,663,660
REFRACTORY ARTICLE AND METHOD OF MAKING SAME
Filed Dec. 8. 1924
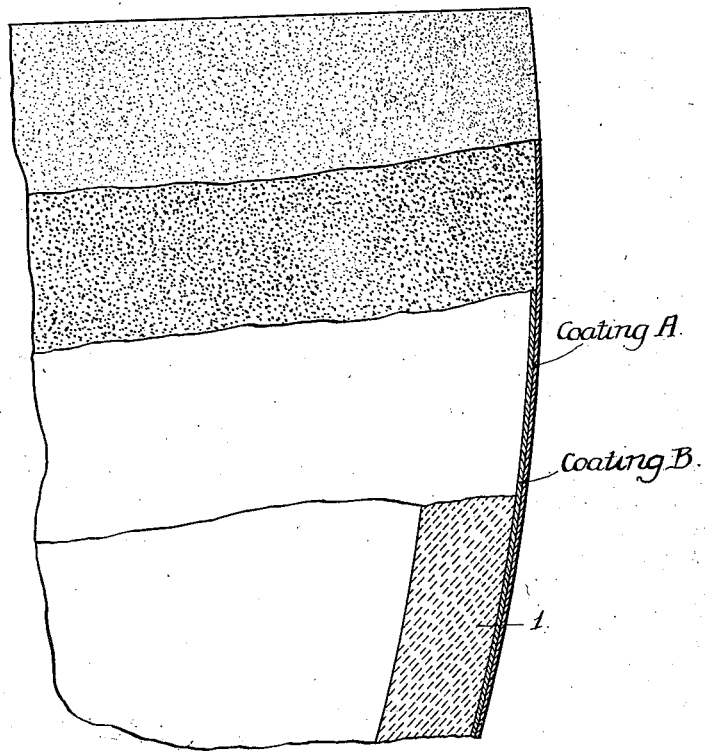
Inventor:
Adolph F. Hottinger, Patented Mar. 27, 1928.

1,663,660

UNITED STATES PATENT OFFICE.

ADOLPH F. HOTTINGER, OF CHICAGO, ILLINOIS, ASSIGNOR TO CHICAGO CRUCIBLE COMPANY, OF CHICAGO, ILLINOIS, A CORPORATION OF ILLINOIS.

REFRACTORY ARTICLE AND METHOD OF MAKING SAME.

Application filed December 8, 1924. Serial No. 754,478.

The present invention relates to methods of making refractory articles.

The present application is a continuation as to common subject matter of application Serial No. 723,952 for improvements in refractory articles, filed July 3, 1924.

The present invention has for one of its objects the provision of a refractory article having a coating which will effectually protect the materials in said article against oxidation.

A further object is to provide a method of glazing a refractory article which will throughout the glazing operation and thereafter protect the material of said refractory article from oxidation.

Further objects will appear as the description proceeds.

The present invention, though of broad application, will be described with reference to crucibles, which commonly include carbonaceous material such as graphite in very considerable amounts. Inasmuch as said carbonaceous material will oxidize at the high temperatures to which crucibles are subjected, some method must be provided for glazing said crucibles. This glazing operation as heretofore practiced has been relatively expensive, or if less expensive processes have been used the glaze has been quite insufficient for the purpose of protecting the graphite against oxidation.

The one figure of the drawing represents diametrically two coatings upon the outside of a crucible or the like, said two coatings being represented at an intermediate stage of its manufacture, that is, the stage after the glazing material has been applied and prior to the firing of the crucible.

The material of a crucible is indicated by the numeral 1 and two coatings of glazing material thereon are represented by the letters A and B. The coating A having a fusing temperature at the ignition temperature of graphite or other oxidizable material used in the article to be protected; or having a fusing temperature as little above the ignition temperature as possible. The other coating B has a higher fusing temperature, which temperature is sufficient to vitrify the clay commonly used in the crucible or other article being glazed, which vitrification of the clay is of advantage inasmuch as it then acts as a seal for the graphite particles. After the lower fusing coat A has been fused and while the temperature of the kiln is being further raised, said fused coating will combine with the higher fusing glaze B and will, during the entire range of firing, protect the graphite against ignition. As at present preferred, the inner coating B is formed of material fusing at the higher temperature, that is—the temperature sufficient to vitrify the clay in the crucible.

The temperature of fusing of the outer coating A will dehydrate or calcine the clay of the crucible. As ordinarily provided, said crucible contains feldspar or other fluxes, and by reason of this fact, if the finished crucible should have part or all of its coating knocked off, said crucible would be self-glazing. This phenomenon is due to the fact that the clay bond and fluxes of the crucible have been brought to the point of vitrification in the original firing of the crucible. When the unglazed portion of said crucible, i. e., the portion from which the glaze has been knocked off, is subjected to high temperature in service, the exposed particles of graphite will be oxidized, allowing the vitrified clay and fluxes to flow over the pits left by the oxidized graphite, whereby the exposed portion of the crucible will be glazed over. The fact that the clay and fluxes have been vitrified is the reason for such flowing, clay and fluxes which have been merely calcined or dehydrated having no such protective action.

The chemical compositions of the two coatings may be chosen as desired. For the inner coating B which matures or fuses at a higher temperature the following formula may be used:

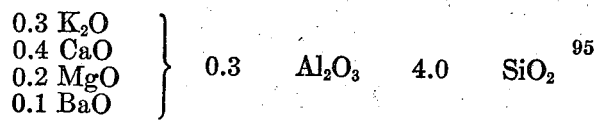

For the outer or lower melting coat A, the following formula may be used:

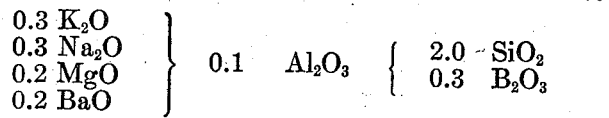

The practice at present preferred is to apply composition B first, after which composition A is superimposed upon composition B. Then the crucible is fired to the fusing point of composition A, and the temperature is gradually raised to the fusing point of composition B.

Using the method conventionally practiced among ceramists, that is—denominating the fluxing materials as RO, the basic oxides as $R_2O_3$, and the acid materials as $SiO_2$, the following formula is given in such conventional form as may be readily interpreted by those skilled in the ceramic arts:

$$1.0\ RO\text{---}1.107\ R_2O_3\text{---}3.95\ SiO_2$$

It is, of course, understood and implied that any of the three terms of the formula appearing immediately above may be made up of any suitable flux base or acid, respectively, as is usually implied in such formulæ.

In firing the crucible, coated either singly or doubly, as above described, the graphite is protected against oxidation throughout the entire range of the firing process, from below the ignition point of the graphite up to and above the vitrification point of the clay and fluxes.

An article such as a crucible having carbon or graphite as part of its composition will be effectually protected by either or both of the coatings above referred to, whereby said carbon or graphite will be prevented from burning when subjected to a high heat. The coatings are peculiarly adapted for crucibles for the reason that in the process of manufacturing the crucibles the clay and fluxes used in the crucible structure can be brought to a fused condition without destruction of the graphite therein. The present invention provides a means whereby a crucible may safely acquire a temperature above the point of ignition of the graphite in said crucible and in an oxidizing atmosphere.

By reason of the process outlined, the result is attained that a glaze may be applied to a crucible containing graphite which glaze will effectually protect said graphite against oxidation at the highest temperatures to which said graphite will be subjected in service. Said glaze may be applied in a single firing, thereby cutting down the cost of handling and manufacture and the cost due to breakage.

Though the preferred process has been described in detail, it will be clear that many modifications will occur to those skilled in the art. It is intended to cover all such modifications that fall within the scope of the appended claims.

What is claimed is:

1. A crucible containing carbonaceous material, clay and flux, and having a coating thereon, said coating having a constituent composition fusible at approximately the ignition temperature of said carbonaceous material and also having a constituent composition fusible at approximately the vitrifying temperature of said clay.

2. A crucible containing carbonaceous material and clay, said crucible having a glazing material thereon, said glazing material comprising two coats, the outer coat comprising a composition fusible at approximately the ignition temperature of said carbonaceous material, the inner coat having a composition fusible at approximately the vitrifying temperature of said clay.

3. The method of glazing a refractory article containing carbonaceous material and clay which consists in applying to said refractory article a glazing material having a constituent composition fusible at approximately the ignition temperature of said carbonaceous material and also having a constituent composition fusible at approximately the vitrifying temperature of said clay, and fusing said constituents at a single firing in a kiln having a progressively rising temperature.

4. The process of applying a glaze to a refractory article containing carbonaceous material and clay which consists in coating said refractory article with a constituent composition fusible at approximately the ignition temperature of said carbonaceous material and with a constituent composition fusible at approximately the vitrifying temperature of said clay, heating said refractory article up to the fusing temperature of said first mentioned constituent composition and rapidly raising the temperature up to the fusing temperature of the second mentioned constituent composition.

5. The process of applying a glaze to a crucible containing graphite and clay which consists in applying a coat according to the following formula:

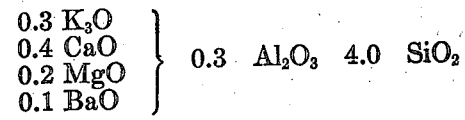

applying a superimposed coat according to the following formula:

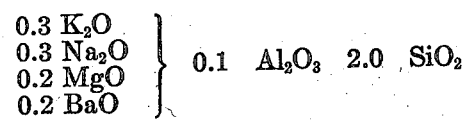

applying heat to said crucible up to the fusing point of said second mentioned coat, and increasing the temperature up to the fusing temperature of said first mentioned coat.

6. A crucible containing carbonaceous material and clay, said crucible having two coatings thereon, one superimposed upon the other, the inner coat having approximately the following formula:

$$\left.\begin{array}{l}0.3\ K_2O\\ 0.4\ CaO\\ 0.2\ MgO\\ 0.1\ BaO\end{array}\right\} \quad 0.3\ Al_2O_3 \quad 4.0\ SiO_2$$

the outer coating having the following formula:

$$\left.\begin{array}{l}0.3\ K_2O\\ 0.3\ Na_2O\\ 0.2\ MgO\\ 0.2\ BaO\end{array}\right\} \quad 0.1\ Al_2O_3 \quad 2.0\ SiO_2$$

Signed at Chicago, Illinois, this 4th day of Dec., 1924.

ADOLPH F. HOTTINGER.